United States Patent
Kim et al.

(10) Patent No.: US 11,164,150 B1
(45) Date of Patent: Nov. 2, 2021

(54) ELECTRONIC APPARATUS AND INFORMATION PROVIDING METHOD THEREOF

(71) Applicant: Coupang Corp., Seoul (KR)

(72) Inventors: Sung Eun Kim, Seoul (KR); Woo Jung Park, Seoul (KR); Ji Won Hwang, Seoul (KR); Jeong Seok Oh, Seoul (KR); Se Hwan Chung, Seoul (KR)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 17/153,158

(22) Filed: Jan. 20, 2021

(30) Foreign Application Priority Data

Dec. 11, 2020 (KR) .................. 10-2020-0173130

(51) Int. Cl.
*G06Q 10/08* (2012.01)
*G08B 21/18* (2006.01)
*G06Q 50/28* (2012.01)

(52) U.S. Cl.
CPC ......... *G06Q 10/0875* (2013.01); *G06Q 50/28* (2013.01); *G08B 21/18* (2013.01)

(58) Field of Classification Search
CPC ..... G06Q 10/0875; G06Q 50/28; G08B 21/18
See application file for complete search history.

(56) References Cited

U.S. PATENT DOCUMENTS

| 7,689,465 | B1* | 3/2010 | Shakes ............ G06K 9/78 705/27.1 |
| 2004/0128015 | A1 | 7/2004 | Booth et al. |
| 2007/0203808 | A1* | 8/2007 | Sekimoto ............ G06Q 10/087 705/28 |
| 2010/0057592 | A1* | 3/2010 | Moir ............ G01G 23/3742 705/29 |
| 2016/0349736 | A1 | 12/2016 | Cheng et al. |
| 2017/0350635 | A1* | 12/2017 | Thirumurugavel .......... G06Q 10/0832 |
| 2018/0330462 | A1* | 11/2018 | Adachi .......... G06Q 10/06 |

FOREIGN PATENT DOCUMENTS

| JP | 2002-002924 A | 1/2002 |
| JP | 2002-099827 A | 4/2002 |
| JP | 2002-197156 A | 7/2002 |
| JP | 2003-002443 A | 1/2003 |
| JP | 2004-102746 A | 4/2004 |
| JP | 2004-527021 A | 9/2004 |
| JP | 2012-022401 A | 2/2012 |
| JP | 2014-002432 A | 1/2014 |
| JP | 2018-116399 A | 7/2018 |
| JP | 2019-023928 A | 2/2019 |
| JP | 2019-091201 A | 6/2019 |

(Continued)

*Primary Examiner* — Phung Nguyen
(74) *Attorney, Agent, or Firm* — Knobbe, Martens, Olson & Bear, LLP

(57) ABSTRACT

An information providing method of an electronic apparatus is disclosed. The information providing method includes checking an invoice identification number of a package selected from among one or more packages which have been packed by at least one packing worker, checking a box identification number of the package, and providing guide information for a packing inspection of the package based on the invoice identification number and the box identification number.

13 Claims, 17 Drawing Sheets

(56) References Cited

FOREIGN PATENT DOCUMENTS

| | | |
|---|---|---|
| JP | 2020-033124 A | 3/2020 |
| KR | 10-1515962 B1 | 5/2015 |
| KR | 10-2016-0140474 A | 12/2016 |
| KR | 10-2017-0107805 A | 9/2017 |
| KR | 10-2017-0109445 A | 9/2017 |
| WO | WO 2005-115890 A1 | 12/2005 |

\* cited by examiner

FIG. 5

| A01 | A02 | A03 | A04 | A05 |
|---|---|---|---|---|
| ⋮ | | ⋮ | | ⋮ |
| C01 | C02 | C03 | C04 | C05 | C06 | C07 |
| ⋮ | | ⋮ | | ⋮ | |
| E01 | E02 | E03 | E04 | E05 | E06 | E07 | E08 | E09 | E10 |

FIG. 6C

| Packing inspection |
|---|
| 605 — Invoice identification number |
| 611 — Select how auxiliary packing material is arranged in box |
| ● One large "⊂" shape |
| ◎ One small "⊂" shape |
| ◎ Two small "⊂" shapes |
| ◎ No auxiliary packing material |
| 613 — Is there refrigerant on top of items? |
| ◎ Yes |
| ● No |
| Confirm | ived
ELECTRONIC APPARATUS AND INFORMATION PROVIDING METHOD THEREOF

BACKGROUND

Technical Field

The present disclosure relates to an electronic apparatus for providing relevant information to an inspection worker and an information providing method of the electronic apparatus.

Description of the Related Art

Hundreds of items are delivered per day on average. In the case of an item delivery service, it is important to rapidly deliver ordered items to customers. Together with speed, it is also important to increase customers' trust by delivering items ordered by the customers with appropriate packing. When packages are delivered to customers without an inspection process, it is difficult to check errors caused by workers in charge during classification and packing processes, and customers' trust may be degraded. Consequently, an inspection process is required for packages, and a technique for providing relevant information to an inspection worker is necessary.

SUMMARY

Technical Goals

The present disclosure is directed to providing an electronic apparatus and an information providing method of the electronic apparatus. Objects of the present disclosure are not limited to those described above, and other objects may be inferred from the following example embodiments.

Technical Solutions

According to a first example embodiment, an information providing method of an electronic apparatus includes checking an invoice identification number of a package selected from among one or more packages which have been packed by at least one packing worker, checking a box identification number of the package, and providing guide information for a packing inspection of the package based on the invoice identification number and the box identification number.

The information providing method may further include receiving relevant information from an inspection worker according to the guide information for the packing inspection and, in response to determining that packing of the selected package does not satisfy conditions of the guide information based on the relevant information received from the inspection worker, providing an alarm message to the packing worker corresponding to the selected package.

The providing of the guide information for the packing inspection may include providing a screen for inputting information related to an arrangement of an auxiliary packing material in a box, providing a screen for inputting information on types of items included in the selected package, quantities of the items, whether the items are damaged, and expiration dates of the items, and providing a screen for inputting information on types and quantities of buffers and refrigerants corresponding to the items.

The providing of the guide information for the packing inspection may include providing a screen for inputting information about whether the refrigerants are placed at a preset position corresponding to the items.

The checking of the invoice identification number of the package may include checking the invoice identification number of the package selected through sampling from among the one or more packages which have been packed, and the sampling may be set so that the number of packages selected during a reference time may be increased when packages which have not been packed based on the guide information correspond to a reference value or more.

The information providing method may further include, when the package has not been packed based on the guide information, providing information related to packing of the package so that an inspection worker may repack the package.

The alarm message may include information related to a packing error which has occurred in a packing process of the packing worker.

According to a second example embodiment, an electronic apparatus includes a communication device, a display, and a controller configured to check an invoice identification number of a package selected from among one or more packages which have been packed by at least one packing worker, check a box identification number of the package, and provide guide information for a packing inspection of the package based on the invoice identification number and the box identification number.

According to a third example embodiment, a non-transitory recording medium on which a program for executing the above-described method in a computer is recorded.

Details of other aspects are included in the Detailed Description and the accompanying drawings.

Effects

According to the present disclosure, the electronic apparatus may check whether a worker in charge has performed classification work or packing work incorrectly, and the worker in charge may be educated through feedback so that work accuracy of the worker in charge can be improved. In this case, the electronic apparatus may track a process in which a packing error occurs and manage the process thereafter so that a packing error does not repeatedly occur. Also, in the case of a packing error, the electronic apparatus provides packing-related information to an inspection worker with regard to repacking such that a correct item can be rapidly delivered to a customer.

Effects of the present disclosure are not limited to those described above, and other effects which have not been described will be clearly understood by those skilled in the art from the claims.

BRIEF DESCRIPTION OF THE DRAWINGS

FIG. 5 illustrates an arrangement of work cells according to an example embodiment.

FIGS. 6A to 6K illustrate screens displayed on a terminal used by an inspection worker according to an example embodiment.

DETAILED DESCRIPTION

As terms used herein, general terms that are widely used are selected, when possible, in consideration of functions of the present disclosure, but the terms may vary according to intentions of those skilled in the art, precedents, advent of new technologies, and the like. Some terms may be arbitrarily chosen by the present applicant, and in this case, the meanings of these terms will be explained in the corresponding parts of description in detail. Accordingly, the terms used herein should be defined not based on the names thereof but based on the meanings thereof and the whole context of the present disclosure.

Throughout the specification, it will be understood that when a part is referred to as "including" an element, the part does not preclude other elements and may further include other elements unless stated otherwise. Also, terms, such as "unit" and "module," refer to units which perform at least one function or operation, and the units may be implemented as hardware, software, or a combination of hardware and software.

The expression "at least one of A, B, and C" may include the following meanings: A alone; B alone; C alone; both A and B together; both A and C together; both B and C together; and all three of A, B, and C together.

As used herein, a "terminal" may be implemented as a computer or a portable terminal which may access a server or another terminal via a network. Here, the computer includes, for example, a notebook computer, a desktop computer, a laptop computer, etc. in which a web browser is installed, and the portable terminal is a wireless communication device with portability and mobility and may include all kinds of handheld-based wireless communication devices such as communication-based terminals, smart phones, and tablet personal computers (PCs) which support international mobile telecommunication (IMT)-2000, code division multiple access (CDMA), wideband CDMA (W-CDMA), long term evolution (LTE), etc.

Hereinafter, example embodiments of the present disclosure will be described in detail with reference to the accompanying drawings so that those skilled in the art may easily implement the present disclosure. However, the present disclosure may be implemented in various different forms and is not limited to the example embodiments set forth herein.

The example embodiments of the present disclosure will be described in detail below with reference to the drawings.

Figure 1:
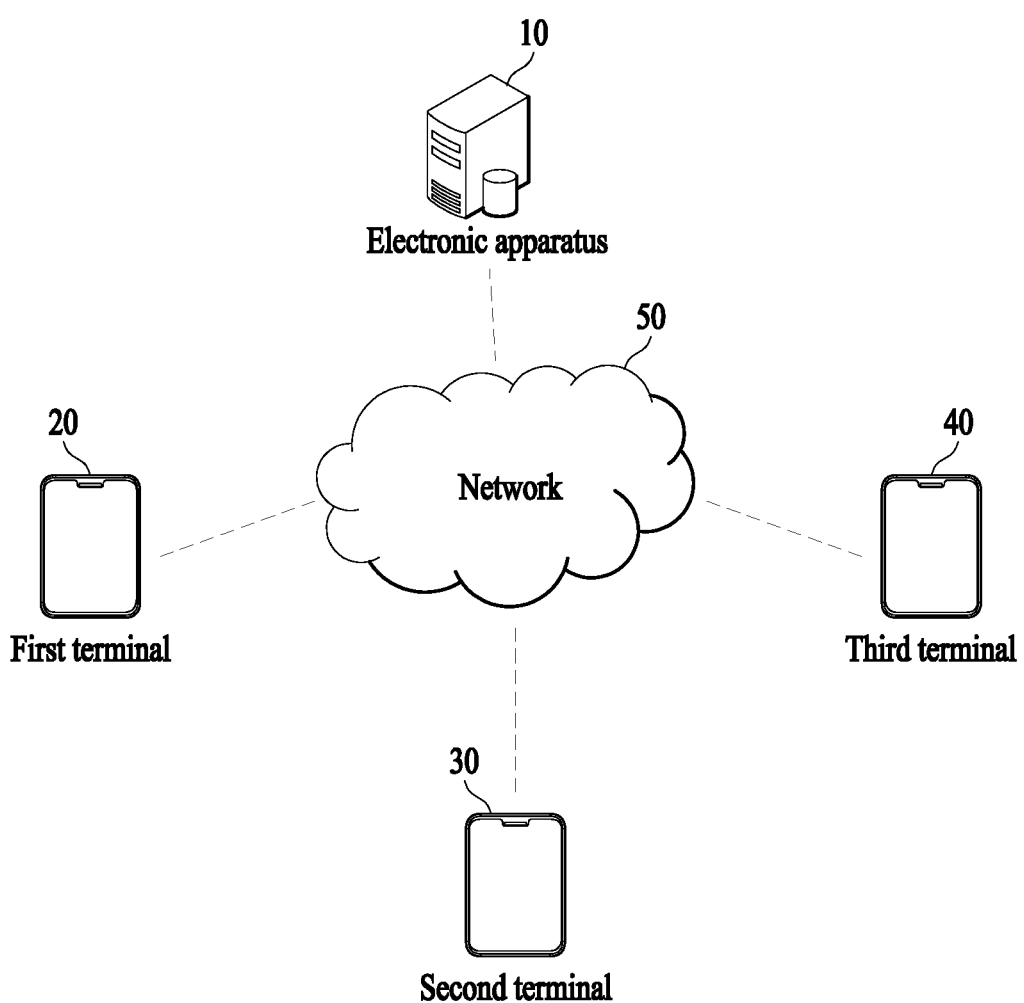
FIG. 1 illustrates a system according to an example embodiment.

FIG. 1 illustrates a system according to an example embodiment.

Referring to FIG. 1, the system may include an electronic apparatus 10, a first terminal 20, a second terminal 30, a third terminal 40, and a network 50. In the system shown in FIG. 1, only elements related to this embodiment are shown. Accordingly, those skilled in the art should understand that general-use elements other than those shown in FIG. 1 may be further included.

The electronic apparatus 10, the first terminal 20, the second terminal 30, and the third terminal 40 may communicate with each other in the network 50. The network 50 includes a local area network (LAN), a wide area network (WAN), a value added network (VAN), a mobile radio communication network, a satellite communication network, and combinations thereof. The network 50 is a data communication network having a comprehensive meaning that the network elements shown in FIG. 1 are allowed to smoothly communicate with each other and may include wired Internet, wireless Internet, and a mobile wireless communication network. Wireless communication may be, for example, Wi-Fi, Bluetooth, Bluetooth low energy, ZigBee, Wi-Fi direct (WFD), ultra-wideband (UWB), infrared data association (IrDA), near field communication (NFC), etc. but is not limited thereto.

The electronic apparatus 10 may provide all information related to item delivery and may be included in a server which provides the information related to item delivery. Specifically, the electronic apparatus 10 may provide information related to item classification regarding a work cell included in a work-target set to a classification worker. Also, the electronic apparatus 10 may provide information related to packing work regarding items included in a work cell to a packing worker. Further, the electronic apparatus 10 may provide guide information for a packing inspection of packages which have been packed to an inspection worker. In this way, the electronic apparatus 10 may provide information related to item classification work, packing work, and inspection work to each worker.

The electronic apparatus 10 may provide an application for providing information to the first terminal 20, the second terminal 30, and the third terminal 40. The first terminal 20 may be a terminal used by a classification worker, the second terminal 30 may be a terminal used by a packing worker, and the third terminal 40 may be a terminal used by an inspection worker. The classification worker may classify items in units of work cells using information provided through the first terminal 20 by the electronic apparatus 10. The packing worker may perform packing work for items included in a work cell using information provided through the second terminal 30 by the electronic apparatus 10. The inspection worker may perform a packing inspection of a package which has been packed using the guide information provided through the third terminal 40 by the electronic apparatus 10.

In the example embodiment, the work-target set may include a plurality of work cells, and each work cell may be assigned so that items included in a specific order may be classified and placed according to classification. A classification worker may perform classification work so that items corresponding to order information may be classified into a corresponding work cell. When all the items corresponding to the order information are included in the work cell, the classification worker may provide classification completion information to the packing worker through a preset notification method. Here, the items included in the work cell may be items purchased by one purchaser and delivered to the same address. The packing worker may perform packing work for a work cell which is selected based on priority order information among a plurality of work cells which have been classified. Specifically, the packing worker may perform packing work for items included in the work cell which is selected based on priority information. When the packing work for the items included in the work cell is completed, the classification worker may receive a notification through a preset method, and packing completion information of the corresponding cell may be provided to the electronic apparatus 10. The electronic apparatus 10 may update relevant information so that items corresponding to order information different from the specific order may be included in the work cell for which the packing work has been completed, and the updated information may be provided to the classification worker. The inspection worker may perform a packing inspection of a package based on the guide information provided through the third terminal 40. When it is determined as a packing inspection result that conditions of the guide information are satisfied, the package which has undergone a packing inspection may be delivered to the purchaser. On the other hand, when it is determined as a packing inspection result that conditions of the guide information are not satisfied, the electronic apparatus 10 may provide an alarm message to the classification worker or the packing worker. The alarm message may include information related to a packing error which occurs during a work process of the classification worker or the packing worker, and the completion level of the work of the classification worker or the packing worker may be improved through the feedback of the alarm message.

A detailed process performed by the electronic apparatus 10, the first terminal 20, the second terminal 30, and the third terminal 40 with regard to information providing will be described below.

Figure 2:
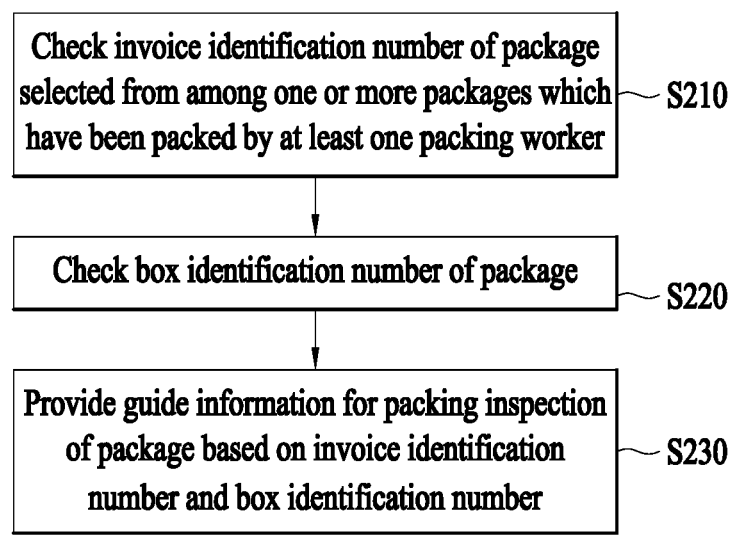
FIG. 2 illustrates a method of providing information to an inspection worker according to an example embodiment.

FIG. 2 illustrates a method of providing information to an inspection worker according to an example embodiment.

Referring to FIG. 2, in operation S210, an electronic apparatus may check an invoice identification number of a package selected from among one or more packages which have been packed by at least one packing worker. The invoice identification number is a unique number including information related to all matters of item delivery, and the information related to all matters of the package may be checked by checking the invoice identification number of the package.

Specifically, the electronic apparatus may check an invoice identification number of a package selected through sampling from among one or more packages which have been packed. The electronic apparatus does not provide guide information for a packing inspection of all packages which have been packed and may provide guide information for a packing inspection of packages sampled under a preset condition.

According to the example embodiment, when the number of packages with a packing error is a reference value or more, the electronic apparatus may set sampling so that the number of packages selected during a reference time may increase. Accordingly, an inspection worker may perform a packing inspection of a larger number of packages through adjusted sampling, and the electronic apparatus may track a work process in which a packing error has occurred (e.g., classification work or packing work) and provides feedback to the corresponding work process as a result of tracking so that a packing error rate may be reduced. A specific process of providing feedback will be described in detail below. Here, a packing error may correspond to a state in which packing has not been done based on the guide information. For example, sampling is performed to select one of ten packages. In this case, when a packing error rate is 5% or more, the electronic apparatus which monitors packing errors may adjust sampling so that four of ten packages which have been packed during one hour may be selected. When a larger number of packages undergo a packing inspection, it is possible to track a previous work process in which a packing error has occurred (e.g., classification work or packing work), and feedback may be provided to the corresponding work process as a result of tracking so that the packing error rate may be reduced. In this case, a level to which the number of packages selected during the reference time may vary according to the packing error rate. For example, sampling may be set to correspond to level 1 when the packing error rate is in the range of 0% to 5%, sampling may be set to correspond to level 2 when the packing error rate is in the range of 5% to 10%, and sampling may be set to correspond to level 3 when the packing error rate is 10% or more. Here, level 1 may be a setting in which two of ten packages having been packed are selected during the reference time, level 2 may be a setting in which four of ten packages having been packed are selected during the reference time, and level 3 may be a setting in which seven of ten packages having been packed are selected during the reference time.

According to the example embodiment, the electronic apparatus may monitor packing errors and check a packing worker who has not packed items based on the guide information. In this case, the electronic apparatus may set sampling so that the number of packages completed by the packing worker who has not packed items based on the guide information may increase. Specifically, the electronic apparatus may set sampling so that the number of packages completed by the packing worker who has not packed items based on the guide information may increase among one or more packages which have been packed. For example, a first packing worker and a third packing worker may have a packing error rate smaller than the reference value, but a second packing worker may have a packing error rate larger than the reference value. In this case, the first packing worker may have packed first to tenth packages, the second packing worker may have packed $11^{th}$ to $20^{th}$ packages, and the third packing worker may have packed $21^{st}$ to $30^{th}$ packages. Then, the electronic apparatus may determine ten packages which will undergo a packing inspection through sampling among the first to $30^{th}$ packages which have been packed. The electronic apparatus which monitors packing errors may perform sampling so that the number of packages which have been packed by the second packing worker who has a larger packing error rate may be larger than the number of packages which have been packed by the first packing worker and the third packing worker. For example, the electronic apparatus may sample six among the $11^{th}$ to $20^{th}$ packages which have been packed by the second packing worker, sample two among the first to tenth packages which have been packed by the first packing worker, and sample two among the $21_{st}$ to $30^{th}$ packages which have been packed by the third packing worker. Here, sampling may be set based on packing error rates of the packing workers. Specifically, sampling may be performed at a ratio of A when a packing worker has a packing error rate of 5% or less, sampling may be performed at a ratio of B when a packing worker has a packing error rate of 5% to 10%, and sampling may be performed at a ratio of C when a packing worker has a packing error rate of 10% or more. In this case, the relationship among A, B, and C may be set to be A<B<C. Accordingly, sampling may be set so that a larger number of packages which have been packed by a packing worker who has a larger packing error rate may undergo a packing inspection.

According to the example embodiment, when a packing error rate is the reference value or more, the number of packages selected during the reference time may be increased. In this case, the number of packages of a packing worker who has a larger packing error rate may be increased. The above description may apply here.

In operation S220, the electronic apparatus may check a box identification number of the package. The electronic apparatus may check the box identification number of the package of which invoice identification number has been checked.

In operation S230, the electronic apparatus may provide guide information for packing inspection of the package based on the invoice identification number and the box identification number. Here, the guide information is information about whether packing of the package is appropriate, and an inspection worker may perform packing inspection based on the guide information. Specifically, the electronic apparatus may provide information related to an arrangement of an auxiliary packing material in the box. Also, the electronic apparatus may provide information related to types of items, quantities of the items, whether the items are damaged, and expiration dates of the items. Further, the electronic apparatus may provide information on types and quantities of buffers and refrigerants corresponding to the items. This will be described in detail below with reference to FIG. 6.

The electronic apparatus may receive relevant information from the inspection worker according to the guide information for a packing inspection. In response to determining that the packing of the package does not satisfy conditions of the guide information based on the received relevant information, the electronic apparatus may determine that there is a packing error. Alternatively, in response to determining that the packing of the package satisfies the conditions of the guide information based on the received relevant information, the electronic apparatus may determine that the packing is normal. In response to determining that there is a packing error in the package which has undergone a packing inspection, the electronic apparatus may provide an alarm message to the packing worker who has performed packing work on the package.

Here, a packing error corresponding to at least one of a first category and a second category may occur during a packing process of the packing worker, and the alarm message may include information related to the packing error which occurs during the packing process of the packing worker. For example, the alarm message may include information indicating that a packing error corresponding to the first category has occurred during the packing process of the packing worker. Here, the first category may correspond to packing errors related to refrigerants and packing materials, and the second category may correspond to packing errors related to items. Specifically, the first category may correspond to packing errors related to a discrepancy in the number of refrigerants, a misuse of a type of refrigerant, an error in refrigerant position, and a misuse of a type of packaging material. The second category may correspond to packing errors such as a discrepancy in an item quantity, damage of an item, an item beyond an expiration date, and inclusion of an item which has not been ordered. The alarm message may include information on a category corresponding to a packing error which occurs during the packing process of the packing worker, and the packing worker may receive feedback through the alarm message so that the correctness of packing work can be improved. Unlike a packing error corresponding to the first category, with regard to a packing error corresponding to the second category, an alarm message is transmitted to a classification worker as well as the packing worker such that accuracy in classification work of the classification worker can also be improved through feedback. Alternatively, the electronic apparatus may check a packing error according to each work-target set, and feedback is provided to a classification worker and a packing worker who are in charge of a corresponding work-target set such that work accuracy can be improved. For example, when a relatively large number of packing errors occur in a first work-target set among first to $N^{th}$ work-target sets, the electronic apparatus may transmit an alarm message to a classification worker and a packing worker who are in charge of the first work-target set. In this case, the alarm message may include information indicating that a packing error corresponding to the second category has occurred in the first work-target set.

According to the example embodiment, when a package has not been packed based on the guide information, the electronic apparatus may provide packing-related information of the package so that the inspection worker can repack the package. According to a category corresponding to the packing error, the inspection worker may repack the package based on the packing-related information displayed on a third terminal or move the package to the packing worker who is in charge of packing work so that the packing worker may repack the package. Specifically, when the packing error corresponds to the first category, the electronic apparatus may provide packing-related information through the third terminal, and the inspection worker may repack the package. However, when the packing error corresponds to the second category, the electronic apparatus may provide the relevant information through the third terminal so that the inspection worker may move the package to the packing worker without repacking the package. For example, when it is necessary to add dry ice which is a refrigerant, the packing error corresponds to the first category, and the inspection worker may repack the package based on the information displayed on the third terminal. Also, when an item ordered by a purchaser is missing, the packing error corresponds to the second category. In this case, the inspection work does not repack the package, and the package may be moved to the packing worker.

According to the example embodiment, the electronic apparatus may provide repacking-related information in consideration of a work quota of the inspection worker. When the work quota of the inspection worker is larger than a reference quota, even in the case of a packing error corresponding to the first category, the electronic apparatus may provide the relevant information so that the package may be moved to the packing worker. Here, the reference quota may be a statistical value which is set in advance. Specifically, as described above, the electronic apparatus may set sampling so that the number of packages selected during the reference time may increase when a packing error rate is the reference value or more. Also, the work quota of the inspection worker may increase during the reference time. In this case, even when the packing error corresponds to the first category, the electronic apparatus may provide the relevant information so that the package may be moved to the packing worker.

Figure 3:
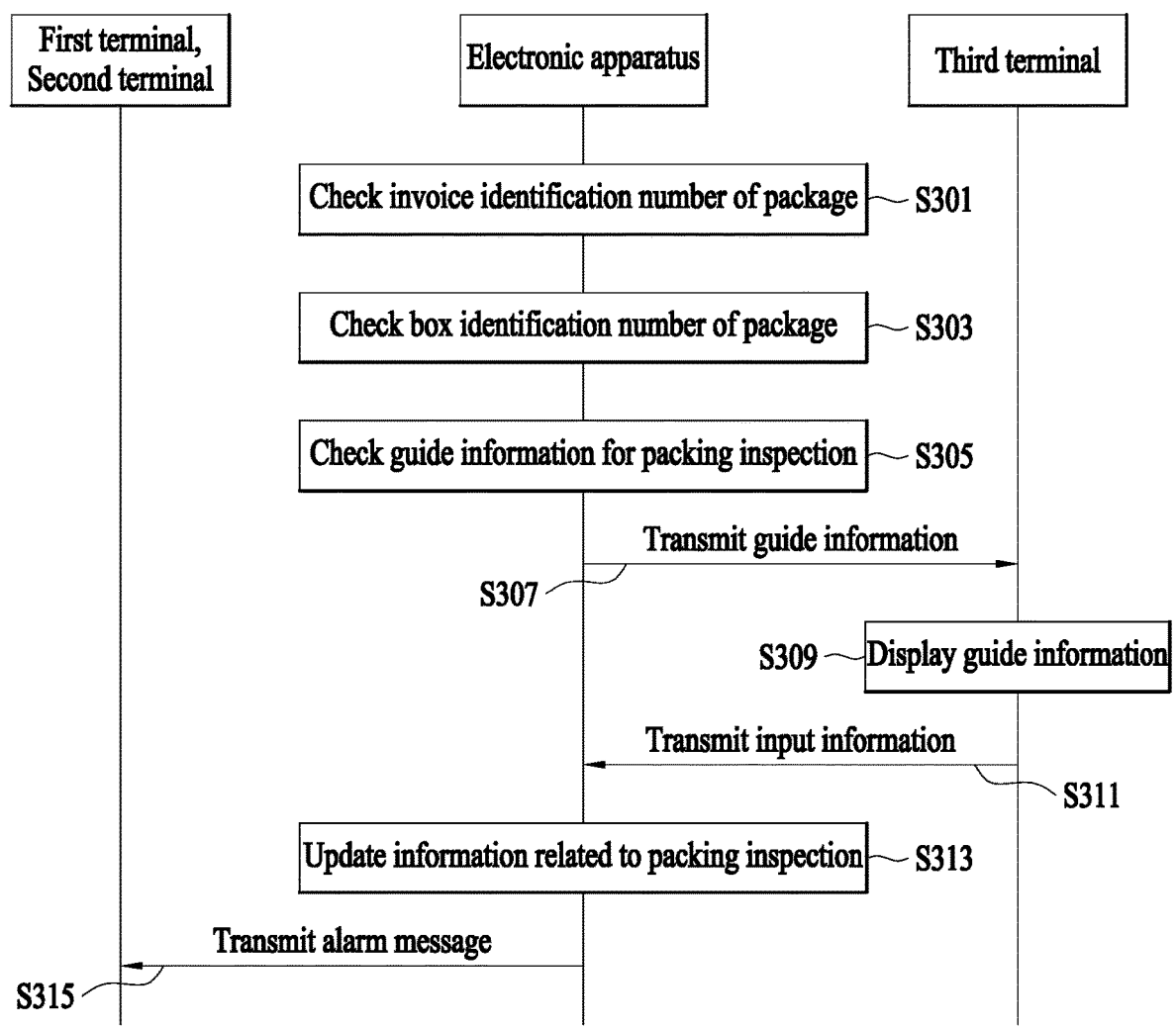
FIG. 3 illustrates a method of exchanging information between an electronic apparatus, a second terminal, and a third terminal according to an example embodiment.

FIG. 3 illustrates a method of exchanging information between an electronic apparatus, a second terminal, and a third terminal according to an example embodiment. Since the above description of the electronic apparatus may apply, a description of overlapping content is omitted.

Referring to FIG. 3, in operation S301, an electronic apparatus may check an invoice identification number of a package selected through sampling from among one or more packages which have been packed. In operation S303, the electronic apparatus may check a box identification number of the package, and in operation S305, the electronic apparatus may check guide information for a packing inspection. For example, the electronic apparatus may check a list of items in a box based on the invoice identification number and check the guide information for a packing inspection about whether packing has been appropriately done for each item.

In operation S307, the electronic apparatus may transmit the guide information to a third terminal. Here, the third terminal may be a terminal used by an inspection worker. In operation S309, the third terminal may display the guide information. The inspection worker may perform a packing inspection using the guide information displayed on the third terminal. For example, the inspection worker may input information using the following screens displayed on the third terminal: i) a screen related to an arrangement of auxiliary packing materials in the box, ii) a screen related to types of the items, quantities of the items, whether the items are damaged, and expiration dates of the items, and iii) a screen related to types and quantities of buffers and refrigerants corresponding to the items. This will be described in detail below with reference to FIG. 6.

In operation S311, the third terminal may transmit information input by the inspection worker to the electronic apparatus. In operation S313, the electronic apparatus may update information related to a packing inspection. In operation S315, in response to determining that packing of the package does not satisfy conditions of the guide information, the electronic apparatus may transmit an alarm message to at least one of a first terminal or a second terminal. The alarm message may include information related to a packing error which has occurred during a work process of a classification worker or a packing worker. The first terminal and the second terminal may display the alarm message so that the classification worker and the packing worker may check the error and improve an incorrect work process.

Figure 4:
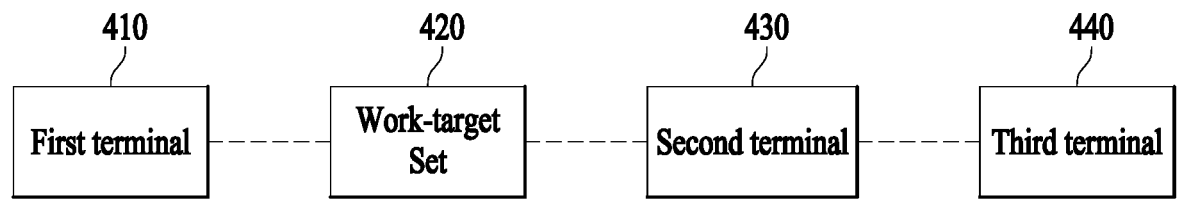
FIG. 4 illustrates an arrangement of a first terminal, a second terminal, a work-target set, and a third terminal according to an example embodiment.

FIG. 4 illustrates an arrangement of a first terminal, a second terminal, a work-target set, and a third terminal according to an example embodiment. Since the above description of the electronic apparatus may apply, a description of overlapping content is omitted.

A first terminal 410 may be a device used by a classification worker, a second terminal 430 may be a device used by a packing worker, and a third terminal 440 may be a device used by an inspection worker. Items may be classified into work cells included in a work-target set 420 based on information checked through the first terminal 410. In other words, items may be assigned to work cells using the information checked through the first terminal 410. For example, a first item and a second item may be classified into a first work cell included in the work-target set 420 based on the information checked through the first terminal 410. Also, a third item and a fifth item may be classified into a second work cell included in the work-target set 420 based on the information checked through the first terminal 410. When work for the first work cell is completed, the first terminal 410 may receive an input of completion from the classification worker, and the electronic apparatus may check the work cell whose item classification has been completed.

The work-target set 420 may include the first work cell to an $N^{th}$ work cell. Here, items included in a work cell whose classification work has been completed may be delivered to the same address. Items included in the first work cell may be delivered to a first address, items included in the second work cell may be delivered to a second address, and items included in the $N^{th}$ work cell may be delivered to an $N^{th}$ address.

When the classification worker completes the classification work into work cells based on the information checked through the first terminal 410, the packing worker may perform packing work for a work cell whose item classification has been completed based on information checked through the second terminal 430. In this case, the electronic apparatus may recommend a work cell based on priority, and the second terminal 430 may provide the relevant information to the packing worker. The packing work for a work cell may be performed based on priority checked through the second terminal 430. The electronic apparatus may select a work cell based on priority information from among the first work cell to the $N^{th}$ work cell included in the work-target set 420. Priority may be determined by sequentially considering i) a scheduled delivery date corresponding to a work cell, ii) a time at which the classification work has been completed, and iii) the number of items included in a work cell. Specifically, the electronic apparatus may provide information related to a work cell according to priority to the second terminal 430 in consideration of a scheduled delivery date corresponding to each work cell. When work cells have the same scheduled delivery date, the electronic apparatus may provide information related to a work cell according to priority to the second terminal 430 in consideration of times at which classification work of the work cells has been completed. For example, when the first work cell and the third work cell have the same scheduled delivery date, the electronic apparatus may preferentially recommend, to the packing worker, the first work cell whose classification work has been completed first. Also, when work cells have the same time at which the classification work has been completed, the electronic apparatus may provide information related to a work cell according to priority to the second terminal 430 in consideration of the numbers of items included in the work cells. A package whose packing work has been completed according to priority may be transferred to the inspection worker.

The inspection worker may perform a packing inspection of a package selected from among one or more packages which have been packed based on information checked through the third terminal 440. For example, when first to $30^{th}$ packages have been packed, the inspection worker may perform a packing inspection of a package checked through the third terminal 440. In this case, the package checked through the third terminal 440 may be a package selected through sampling from among the first to $30^{th}$ packages.

FIG. 5 illustrates an arrangement of work cells according to an example embodiment.

A work-target set may include at least one work cell. For example, the work-target set may include work cells A01 to A05, work cells C01 to C07, and work cells E01 to E10. A row of work cells included in the work-target set may be determined in connection with delivery information. For example, the work cells A and the work cells C may be classified based on delivery information. A first terminal may provide information related to a work cell to which items will be assigned using identification information and delivery information of the items, and a classification worker may classify the items into a corresponding work cell using the first terminal. The first terminal may receive an input indicating that item classification into work cells has been completed from the classification worker, and the electronic apparatus may provide information on a work cell according to priority among the work cells of which item classification has been completed to a second terminal.

FIGS. 6A to 6K illustrate screens displayed on a terminal used by an inspection worker according to an example embodiment. Guide information for a packing inspection may be displayed on a screen, and an inspection worker may perform a packing inspection according to the guide information displayed on the screen.

Figure 6A:
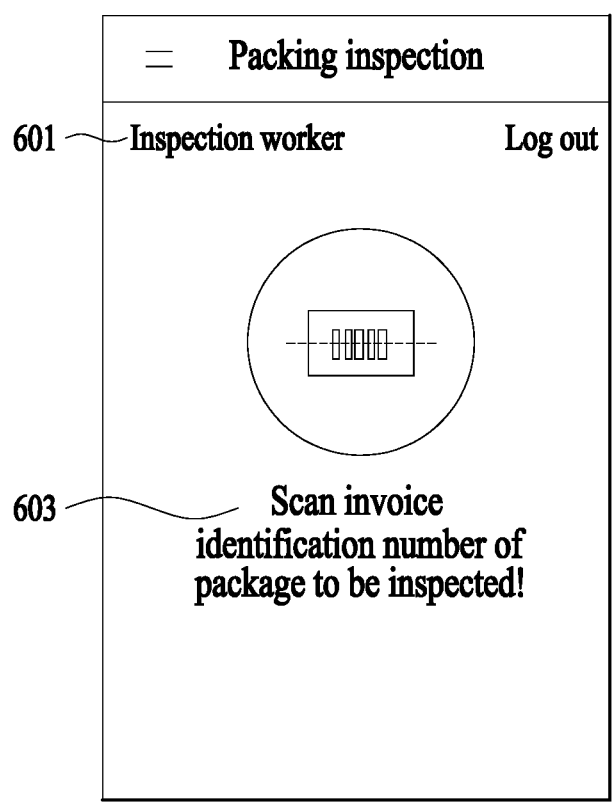

FIG. 6A shows a screen which helps with an inspection of an invoice identification number of a package. In the screen, an area 601 may display information related to an inspection worker (e.g., a name or an identification number of the inspection worker) who is in charge of the packing inspection. When a previous inspection worker logs out and then a new inspection worker logs in, the new inspection worker may perform a packing inspection. An area 603 may display a message "Scan invoice identification number of package to be inspected" and the inspection worker may scan an invoice identification number of a package selected through sampling. When the invoice identification number has not been verified for shipment, the electronic apparatus, which checks the invoice identification number, may provide information "Invoice identification number is invalid" to a third terminal.

Figure 6B:
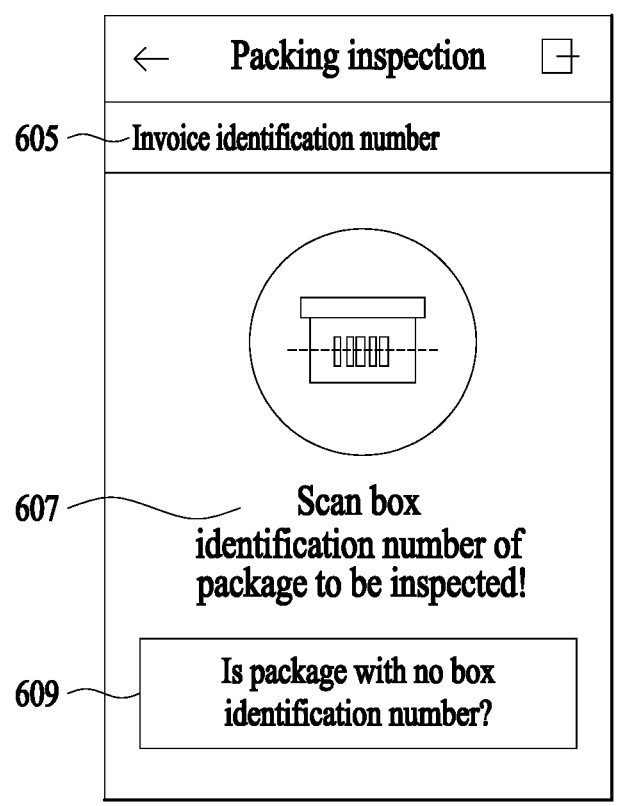

FIG. 6B shows a screen which helps with an inspection of a box identification number of a package. An area 605 may display the invoice identification number checked in FIG. 6A. An area 607 may display a message "Scan box identification number of package to be inspected" and the inspection worker may scan a box identification number of the package. An area 609 may display a message "Is package with no box identification number?" and the inspection worker may select the area 609 when the package does not have a box identification number. When the box identification number is invalid, the electronic apparatus may provide information "Box identification number is invalid" to the third terminal.

FIG. 6C shows a screen which helps with an inspection of an arrangement of an auxiliary packing material and a position of refrigerants. An area 611 may display a message "Select how auxiliary packing material is arranged in box." The arrangement of an auxiliary packing material may be set in advance in consideration of the number of items and the size of items. For example, when different types of items, which are refrigerated items and frozen items, are packed together with different types of refrigerants, the auxiliary packing material may be arranged in two small "c" shapes so that the refrigerated items and the frozen items may be separated. The inspection worker may check the arrangement of the auxiliary packing material in the box and select the relevant information on the screen. For example, the inspection worker may select one of preset arrangement forms including i) one large "c" shape, ii) one small "c" shape, iii) two small "c" shapes, and iv) no auxiliary packing material. Here, the auxiliary packing material may be a packing material put in the box to fix items and refrigerants. For example, when refrigerated items and an icepack are in the box, the refrigerated items may be separated from the icepack during a delivery process such that a temperature of the refrigerated items may not be maintained. However, when the refrigerated items and the icepack are fixed by an auxiliary packing material, the temperature of the refrigerated items may be maintained by the icepack during the delivery process.

An area 613 may display a message "Is there refrigerant on top of items?." Refrigerated items or frozen items are packed together with a refrigerant corresponding thereto, and each refrigerant may be packed together with items at a preset position. For example, an icepack may be put on top of refrigerated items, and dry ice may be put on top of frozen items. Refrigerants may be packed at preset positions with an auxiliary packing material together with items and delivered.

Figure 6D:
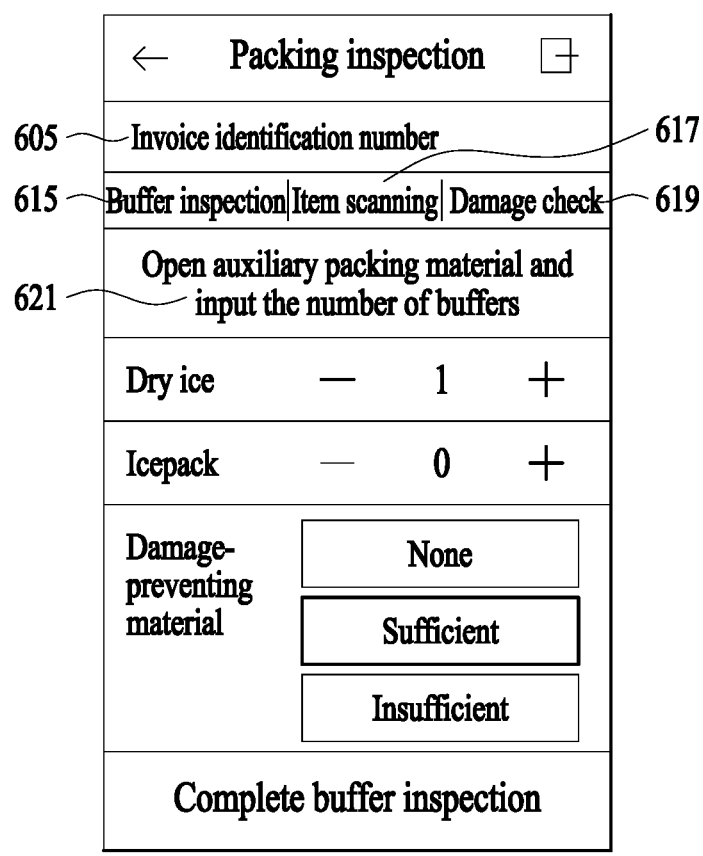

FIG. 6D shows a screen which helps with an inspection of information related to buffers in an auxiliary packing material. In this case, buffer inspection 615 may be activated from among the buffer inspection 615, item scanning 617, and damage check 619. An area 621 may display a message "Open auxiliary packing material and input the number of buffers." Since the box containing items and buffers therein may be sealed with the auxiliary packing material, the inspection worker may open the auxiliary packing material and check buffers. Here, the buffers may include refrigerants, such as dry ice and icepacks, and also include supplementary materials, such as a damage-preventing material, for preventing damage caused by impact during a delivery process. The inspection worker may open the auxiliary packing material to input the number of pieces of dry ice and the number of icepacks and may input information related to a damage-preventing material.

Figure 6E:
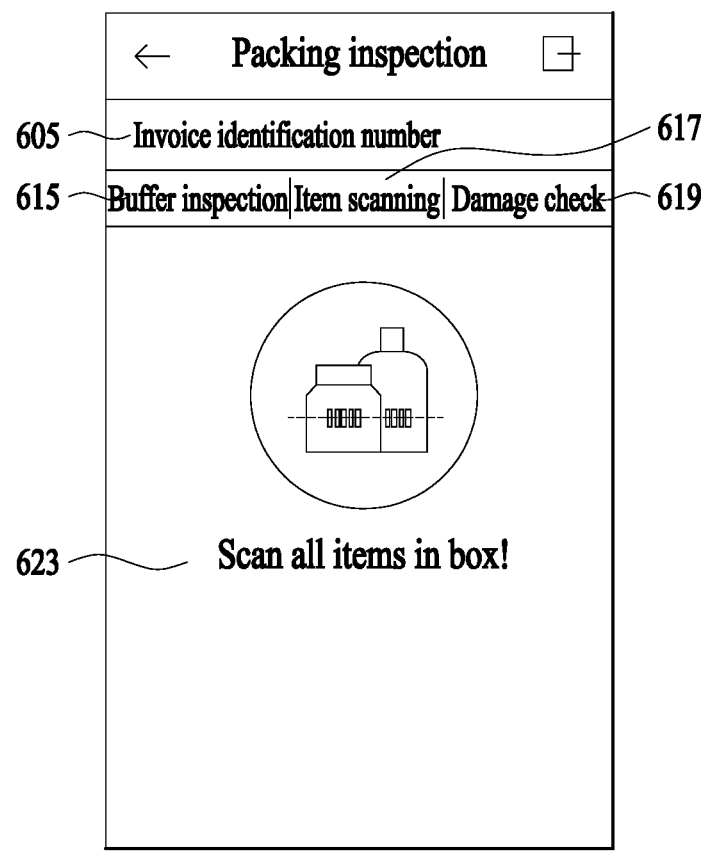
Figure 6F:
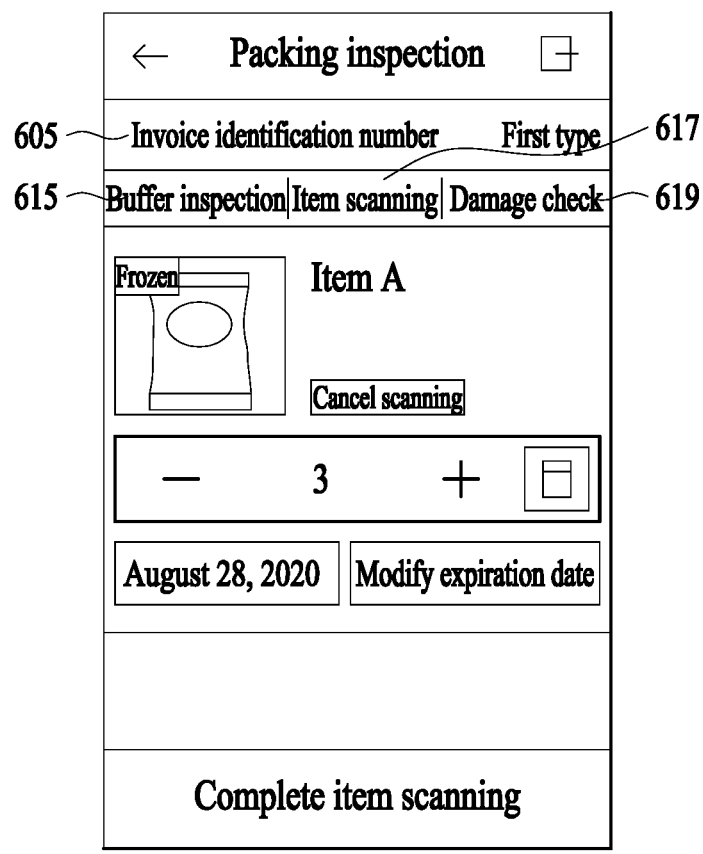
Figure 6G:
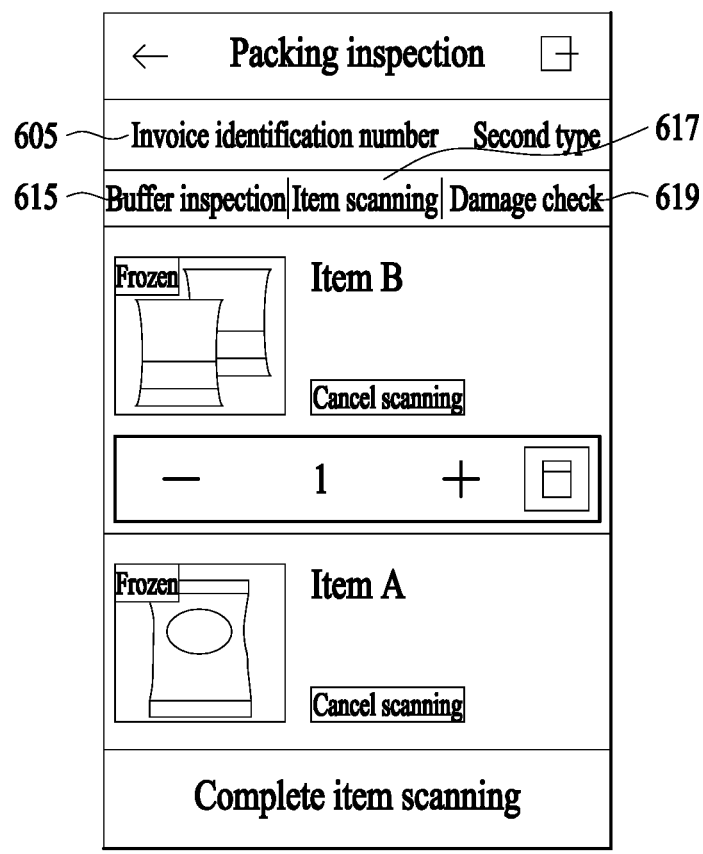

FIG. 6E shows a screen which helps with item scanning. In this case, the item scanning 617 may be activated from among the buffer inspection 615, the item scanning 617, and the damage check 619. An area 623 may display a message "Scan all items in box," and the inspection worker may scan all the items. Specifically, as shown in FIG. 6F, the inspection worker may scan items A, and a screen may be displayed to help with an inspection of information (e.g., the number, expiration date, and production date) which is checked when the items A are scanned. Also, as shown in FIG. 6G, the inspection worker may scan items B as well, and a screen may be displayed to help with an inspection of information (e.g., the number, expiration date, and production date) which is checked when the items B are scanned. Here, when a purchaser has ordered the items A and items C rather than the items A and the items B, the third terminal may display, on the screen, a notification that the items B are packed by mistake and the items C are missing. Also, when the number of items A that the purchaser has ordered is two rather than three, the third terminal may display the discrepancy in the quantity of items A on the screen.

Figure 6H:
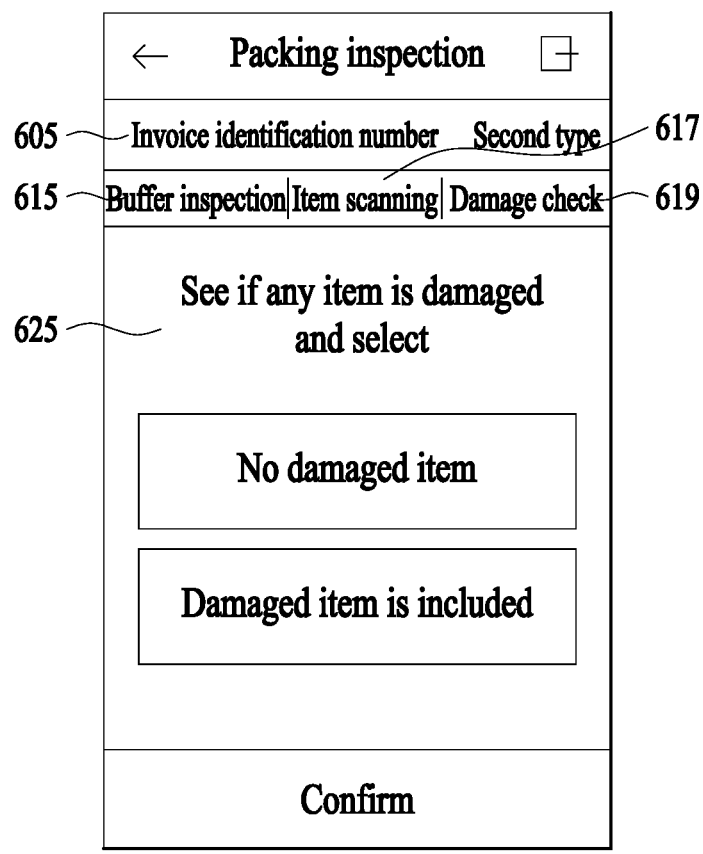

FIG. 6H shows a screen which helps with a damage check. In this case, the damage check 619 may be activated from among the buffer inspection 615, the item scanning 617, and the damage check 619. An area 625 may display a message "See if any item is damaged and select" and the inspection worker may check whether there is a damaged item and select the relevant information on the screen.

Figure 6I:
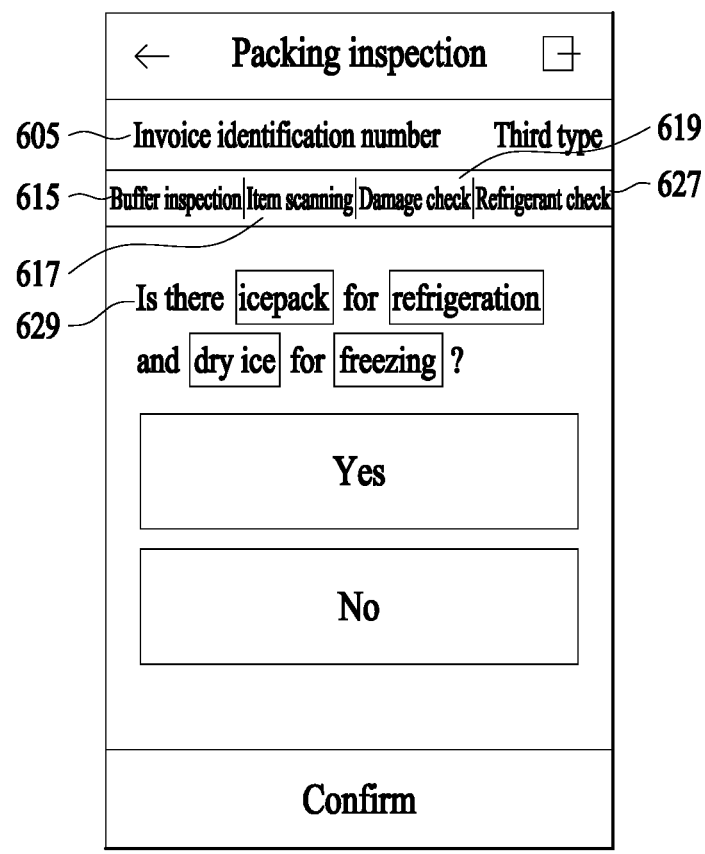

FIG. 6I shows a screen which helps with an inspection when refrigerated items and frozen items are packed together. When refrigerated items and frozen items are packed together, refrigerant check 627 may be displayed in addition to the buffer inspection 615, the item scanning 617, and the damage check 619, and the refrigerant check 627 may be activated. An area 629 may display a message "Is there icepack for refrigeration and dry ice for freezing?" and the inspection worker may check whether refrigerants corresponding to the refrigerated items and the frozen items are packed together and select the relevant information on the screen.

Figure 6J:
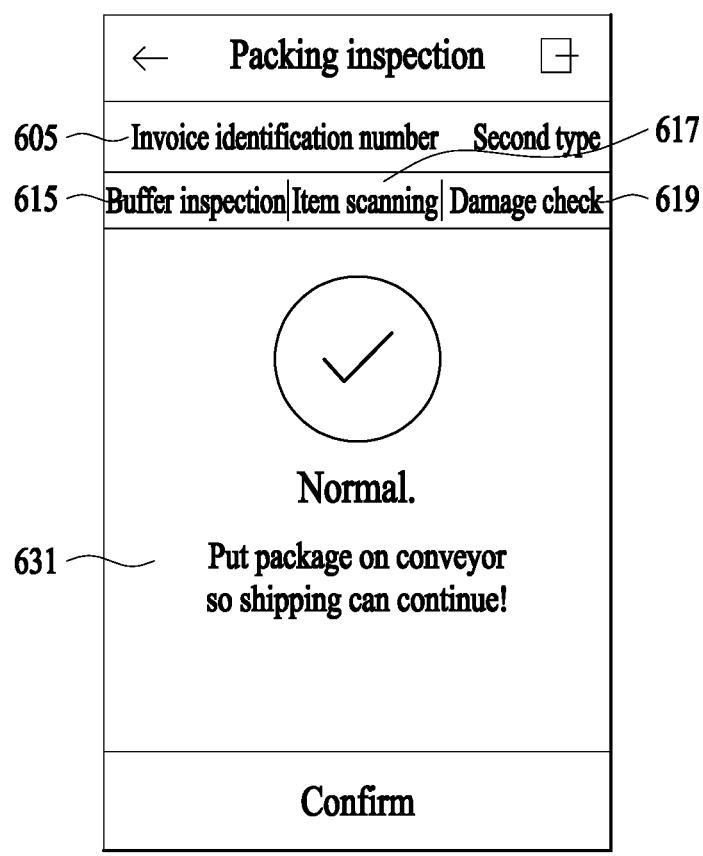
Figure 6K:
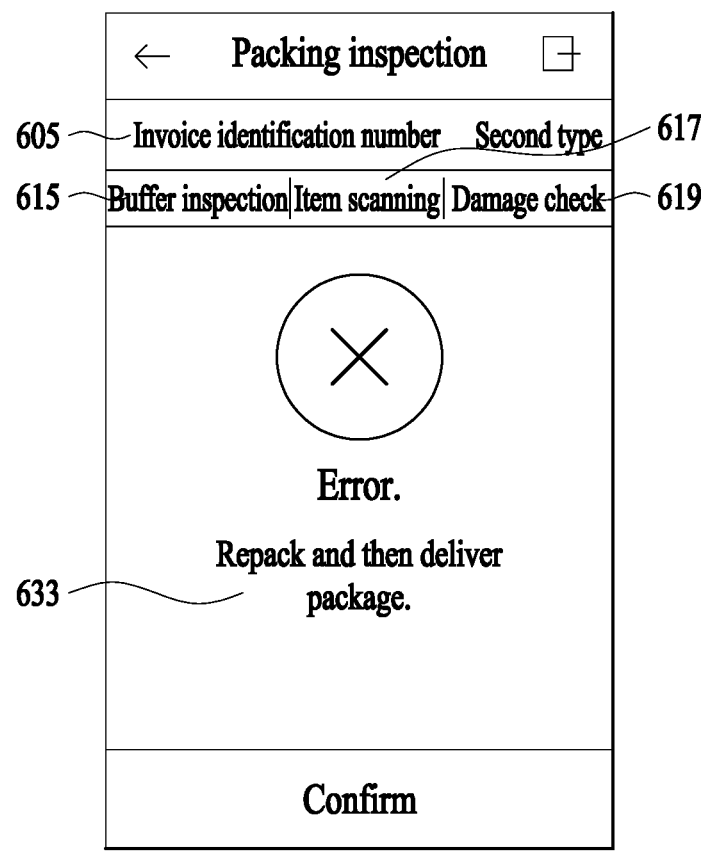

FIG. 6J shows a screen which helps with an inspection when packing is normal, and FIG. 6K shows a screen which helps with an inspection when there is a packing error. When it is checked as a packing inspection result that packing work for the package has been performed normally, a message "Normal. Put package on conveyor so shipping can continue" may be displayed as shown in an area 631, and the inspection worker may put the package which has undergone a packing inspection on a conveyor.

When a packing inspection result is checked that packing work for the package has been performed incorrectly, a message "Error. Repack and then deliver package" may be displayed as shown in an area 633, and the inspection worker may repack the package. For example, when there is not enough damage-preventing material as a buffer inspection result, the quantity of items is incorrect, an item is damaged, or refrigerants corresponding to refrigerated items and frozen items are not included, the electronic apparatus may determine that an inspection result shows a packing error and provide packing-related information for repacking to the third terminal. For example, when the packing error corresponds to the first category which indicates packing errors related to refrigerants and a packing material, the electronic apparatus may provide packing-related information for repacking by the inspection worker to the third terminal. On the other hand, when the packing error corresponds to the second category which indicates packing errors related to items, the electronic apparatus may provide the relevant information to the third terminal so that the package may be transferred to the packing worker.

Figure 7:
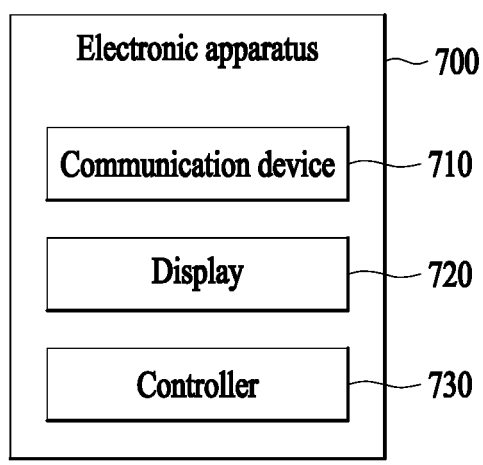
FIG. 7 is a block diagram of an electronic apparatus according to an example embodiment.

FIG. 7 is a block diagram of an electronic apparatus according to an example embodiment.

An electronic apparatus 700 may include a communication device 710, a display 720, and a controller 730 according to the example embodiment. In the electronic apparatus 700 shown in FIG. 7, only elements related to this embodiment are shown. Accordingly, those skilled in the art should understand that general-use elements other than those shown in FIG. 7 may be further included. Since the above description of the electronic apparatus may apply to the electronic apparatus 700, a description of overlapping content is omitted.

The communication device 710 is a device for performing wired or wireless communication and may communicate with an external electronic apparatus. The external electronic apparatus may be a terminal or a server. Communication technology employed by the communication device 710 may be global system for mobile communication (GSM), CDMA, LTE, fifth generation (5G), wireless LAN (WLAN), Wi-Fi, Bluetooth™, radio frequency identification (RFID), IrDA, ZigBee, NFC, and the like. According to the example embodiment, the communication device 710 may be referred to as a transceiver, and the electronic apparatus 700 may exchange information with the terminal through the transceiver.

The display 720 may display information related to the operation of the electronic apparatus 700.

The controller 730 may control the overall operation of the electronic apparatus 700 and process data and signals. The controller 730 may be configured with at least one hardware unit. Also, the controller 730 may be operated by one or more software modules which are generated by executing program code stored in a memory. The controller 730 may include a processor and a memory, and the processor may control the overall operation of the electronic apparatus 700 and process data and signals by executing program code stored in the memory. According to the example embodiment, the controller 730 may include at least one processor.

The controller 730 may check an invoice identification number of a package which is selected through sampling from among one or more packages having been packed and check a box identification number. Also, the controller 730 may provide guide information for packing inspection of the package based on invoice identification number and the box identification number. The inspection worker may perform a packing inspection according to the guide information so that appropriately packed items may be delivered to a purchaser, and thus the purchaser's trust may be improved.

The electronic apparatus or terminal according to the above-described example embodiments may include a processor, a memory which stores and executes program data, a permanent storage such as a disk drive, a communication port which communicates with an external device, a user interface such as a touch panel, keys, and buttons, and the like. Methods realized as software modules or algorithms may be stored as computer-readable code or program commands, which can be executed by the processor, in a computer-readable recording medium. Examples of the computer-readable recording medium include magnetic storage media (e.g., a read-only memory (ROM), a random-access memory (RAM), a floppy disk, and a hard disk), optical reading media (e.g., a compact disc (CD)-ROM and a digital versatile disc (DVD)), and the like. The computer-readable recording medium can also be distributed over computer systems connected via a network so that the computer-readable code is stored and executed in a distributed manner. The computer-readable recording medium may be read by a computer, stored in the memory, and executed by the processor.

The example embodiments of the present disclosure may be realized as functional blocks and various processing operations. The functional blocks may be realized as a plurality of hardware and/or software elements which execute specific functions. For example, the example embodiments may employ integrated circuits including a memory, processing, a logic, a look-up table, etc. which are used to execute various functions through control of one or more microprocessors or other control devices. While elements of the embodiments may be executed by software programming or software elements, the embodiments may be realized with programming or scripting languages including C, C++, Java, assembler, etc. to include various algorithms which are realized as combinations of data structures, processes, routines, or other programming elements. Functional aspects may be realized using algorithms which are executed by one or more processors. Also, the example embodiments may employ conventional techniques for electronic environment setting, signal processing, data processing, and/or the like. The terms such as "mechanism," "element," "means," and "structure" may be widely used and are not limited to mechanical and physical configurations. The terms may include the meanings of a series of routines of software in connection to a processor and the like.

The above-described example embodiments are only exemplary, and other embodiments may be implemented in the scope of the following claims.

What is claimed is:

1. An information providing method of an electronic apparatus, the information providing method comprising:
checking an invoice identification number of a package selected from among one or more packages which have been packed by at least one packing worker;
checking a box identification number of the package; and
providing guide information for a packing inspection of the package based on the invoice identification number and the box identification number.

2. The information providing method of claim 1, further comprising:
receiving relevant information from an inspection worker according to the guide information for the packing inspection; and
providing, in response to determining that packing of the selected package does not satisfy conditions of the guide information based on the relevant information received from the inspection worker, an alarm message to the packing worker corresponding to the selected package.

3. The information providing method of claim 2, wherein the alarm message includes information related to a packing error which has occurred in a packing process of the packing worker.

4. The information providing method of claim 1, wherein the providing of the guide information for the packing inspection comprises:
providing a screen for inputting information related to an arrangement of an auxiliary packing material in a box;
providing a screen for inputting information on types of items included in the selected package, quantities of the items, whether the items are damaged, and expiration dates of the items; and
providing a screen for inputting information on types and quantities of buffers and refrigerants corresponding to the items.

5. The information providing method of claim 4, wherein the providing of the guide information for the packing inspection comprises providing a screen for inputting information about whether the refrigerants are placed at a preset position corresponding to the items.

6. The information providing method of claim 1, wherein:
the checking of the invoice identification number of the package comprises checking the invoice identification number of the package selected through sampling from among the one or more packages which have been packed, and
the sampling is set so that a number of packages selected during a reference time is increased when packages which have not been packed based on the guide information correspond to a reference value or more.

7. The information providing method of claim 1, further comprising:
providing, when the package has not been packed on a basis of the guide information, information related to packing of the package so that an inspection worker repacks the package.

8. A non-transitory computer-readable recording medium on which a program for executing the information providing method of claim 1 in a computer is recorded.

9. An electronic apparatus comprising:
a communication device;
a display; and
a controller configured to:
check an invoice identification number of a package selected from among one or more packages which have been packed by at least one packing worker,
check a box identification number of the package, and
provide guide information for a packing inspection of the package based on the invoice identification number and the box identification number.

10. The electronic apparatus of claim 9, wherein the controller is configured to:
check relevant information input by an inspection worker to the display according to the guide information for the packing inspection, and
provide an alarm message to the packing worker corresponding to the selected package in response to determining that packing of the selected package does not satisfy conditions of the guide information based on the input relevant information.

11. The electronic apparatus of claim 10, wherein the alarm message includes information related to a packing error which has occurred in a packing process of the packing worker.

12. The electronic apparatus of claim 9, wherein:
the controller is configured to check the invoice identification number of the package selected through sampling from among the one or more packages which have been packed, and
the sampling is set so that a number of packages selected during a reference time is increased when packages which have not been packed based on the guide information correspond to a reference value or more.

13. The electronic apparatus of claim 9, wherein the controller is configured to provide information related to packing of the package so that an inspection worker repacks the package when the package has not been packed based on the guide information.

* * * * *